United States Patent [19]
Dieffenderfer et al.

[11] Patent Number: 5,724,572
[45] Date of Patent: Mar. 3, 1998

[54] METHOD AND APPARATUS FOR PROCESSING NULL TERMINATED CHARACTER STRINGS

[75] Inventors: James N. Dieffenderfer, Apex; Harry I. Linzer; Thomas Andrew Sartorius, both of Raleigh, all of N.C.

[73] Assignee: International Business Machines Corporation, Armonk, N.Y.

[21] Appl. No.: 341,789

[22] Filed: Nov. 18, 1994

[51] Int. Cl.$^6$ ............................................. G06F 7/10
[52] U.S. Cl. ................................. 395/606; 341/55
[58] Field of Search ............................ 395/800, 612, 395/606; 341/55

[56] References Cited

U.S. PATENT DOCUMENTS

| | | | |
|---|---|---|---|
| 4,787,060 | 11/1988 | Boudreau | 395/442 |
| 5,001,477 | 3/1991 | Hicks | 341/50 |
| 5,060,143 | 10/1991 | Lee | 395/606 |
| 5,319,779 | 6/1994 | Chang | 395/600 |
| 5,339,421 | 8/1994 | Housel | 395/700 |
| 5,351,243 | 9/1994 | Kalkunte | 370/92 |
| 5,357,431 | 10/1994 | Nakada | 395/606 |
| 5,465,374 | 11/1995 | Dinkjian | 395/800 |
| 5,497,488 | 3/1996 | Akizakia | 395/606 |

*Primary Examiner*—Eric Coleman
*Attorney, Agent, or Firm*—Steven B. Phillips; George E. Clark

[57] ABSTRACT

A method and apparatus for detecting the null byte at the end of a character string. The method and apparatus first logically concatenates two 32-bit input values into a single 64 bit value. Next, the 64-bit value is divided into 8 bytes. Then, a logical OR operation is performed on each byte and the results are put into an encoder. Finally, the encoder interprets the results of the OR operations and places output values into processor registers which indicate whether or where a null byte was detected.

18 Claims, 2 Drawing Sheets

METHOD AND APPARATUS FOR PROCESSING NULL TERMINATED CHARACTER STRINGS

TECHNICAL FIELD OF THE INVENTION

This invention is related in general to data processing systems and in specific to a method and apparatus for efficiently processing null terminated character strings in a data processing system.

BACKGROUND OF THE INVENTION

In computer programming languages such as C and C++, character strings are terminated by a null byte. In other words, character strings are represented within the computer as a series of bytes followed by a byte in which all bits are zero. There are many instances in typical C programs when the computer's central processing unit ("CPU") must quickly find the terminating null byte. When performing a string copy instruction, for example, the CPU determines the length of the string by detecting the string's terminating null byte.

Prior art CPUs have used several different methods to find a string's null byte. One such method involved processing the string one byte at a time. The processor would merely check each byte to determine whether it was null and then react accordingly. This method was very slow because each iteration of the process only handled a single byte. Thus, one iteration of the checking algorithm was required for each character in the string.

Another prior art method was to use a series of complex instructions to perform multi-byte string processing. This method, however, added significant complexity to the data flow because it required multiple cycles to complete. Similarly, the IBM RISC System/6000™ processor used a single complex instruction to find the null byte of a string. The RISC System/6000™ method was undesirable because it required much logic that was not used by other processor instructions.

Therefore, there exists a need for a technique which quickly finds the null byte of a character string yet integrates well into current processor designs.

SUMMARY OF THE INVENTION

It is an object of the present invention to provide a technique which quickly and efficiently detects a null byte at the end of a character string.

It is another object of the present invention to provide a technique which detects a null byte at the end of a character string that integrates well with current Reduced Instruction-set Computer ("RISC") design techniques.

These and other objectives of the present invention are accomplished by a processor instruction in a data processing system comprising a CPU which performs the task. The instruction first logically concatenates two 32-bit input values into a single 64-bit value. Next, the 64-bit value is divided into eight 8-bit bytes. Then, a logical OR operation is performed on the bits of each byte and the results are placed in an encoder. Finally, the encoder interprets the results of the OR operations and places output values into processor registers which indicate whether and/or where a null byte was detected.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following description taken in conjunction with the accompanying drawing, in which.

DETAILED DESCRIPTION OF THE INVENTION

Figure 1:
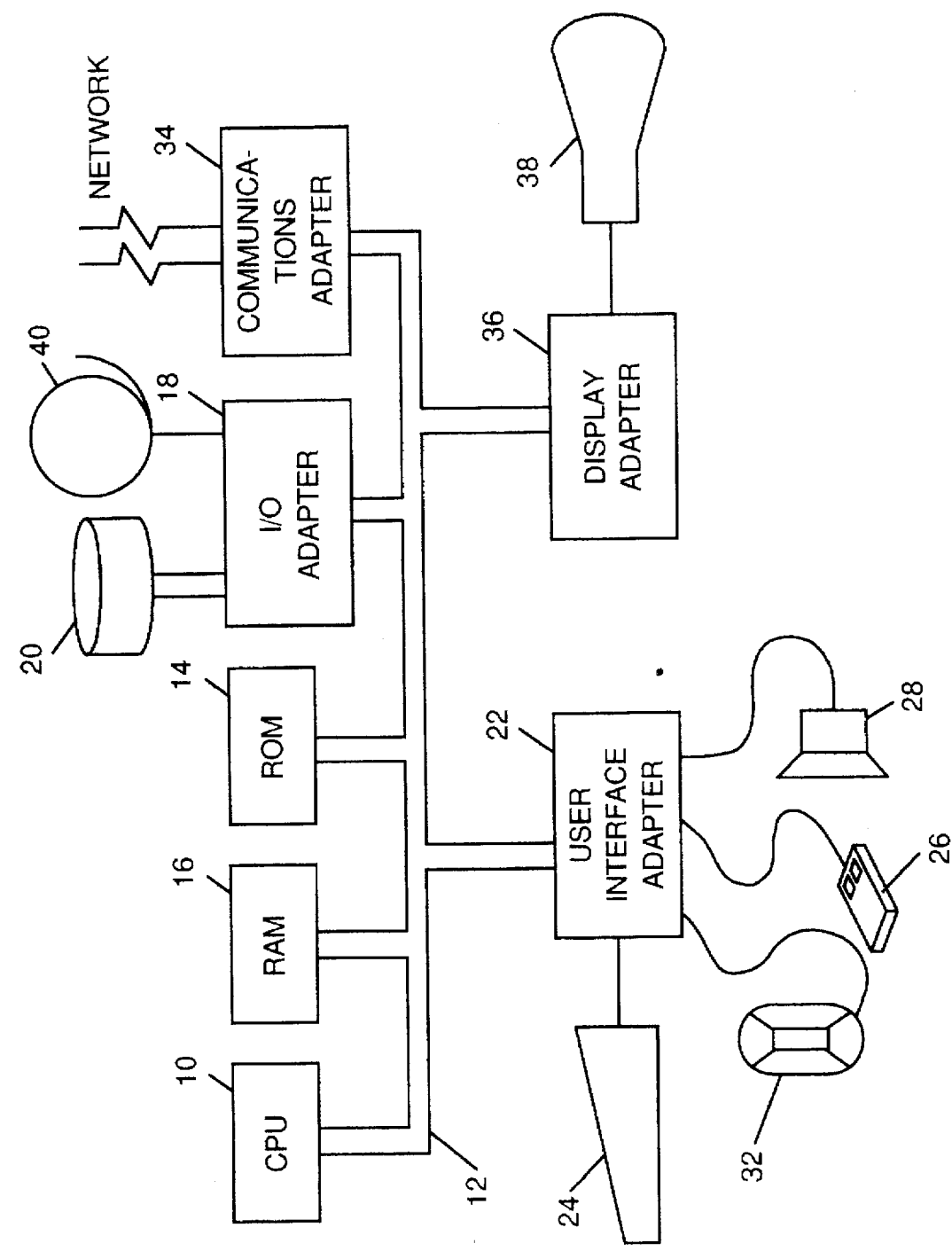
FIG. 1 illustrates a data processing system embodying the present invention.

A preferred embodiment of the present invention is implemented as the dlmzb, or determine left-most zero byte, instruction in various members of the PowerPC 400 family of embedded controllers. A representative hardware system for practicing the present invention is depicted in FIG. 1, which illustrates a typical hardware configuration of a workstation in accordance with the subject invention having central processing unit 10, the PowerPC 400, and a number of other units interconnected via system bus 12. The workstation shown in FIG. 1 includes random access memory (RAM) 14, read only memory (ROM) 16, and input/output (I/O) adapter 18 for connecting peripheral devices such as disk units 20 and tape drives 40 to bus 12, user interface adapter 22 for connecting keyboard 24, mouse 26, speaker 28, microphone 32, and/or other user interface devices such as a touch screen device (not shown) to bus 12, communication adapter 34 for connecting the workstation to a data processing network, and display adapter 36 for connecting bus 12 to display device 38.

Figure 2:
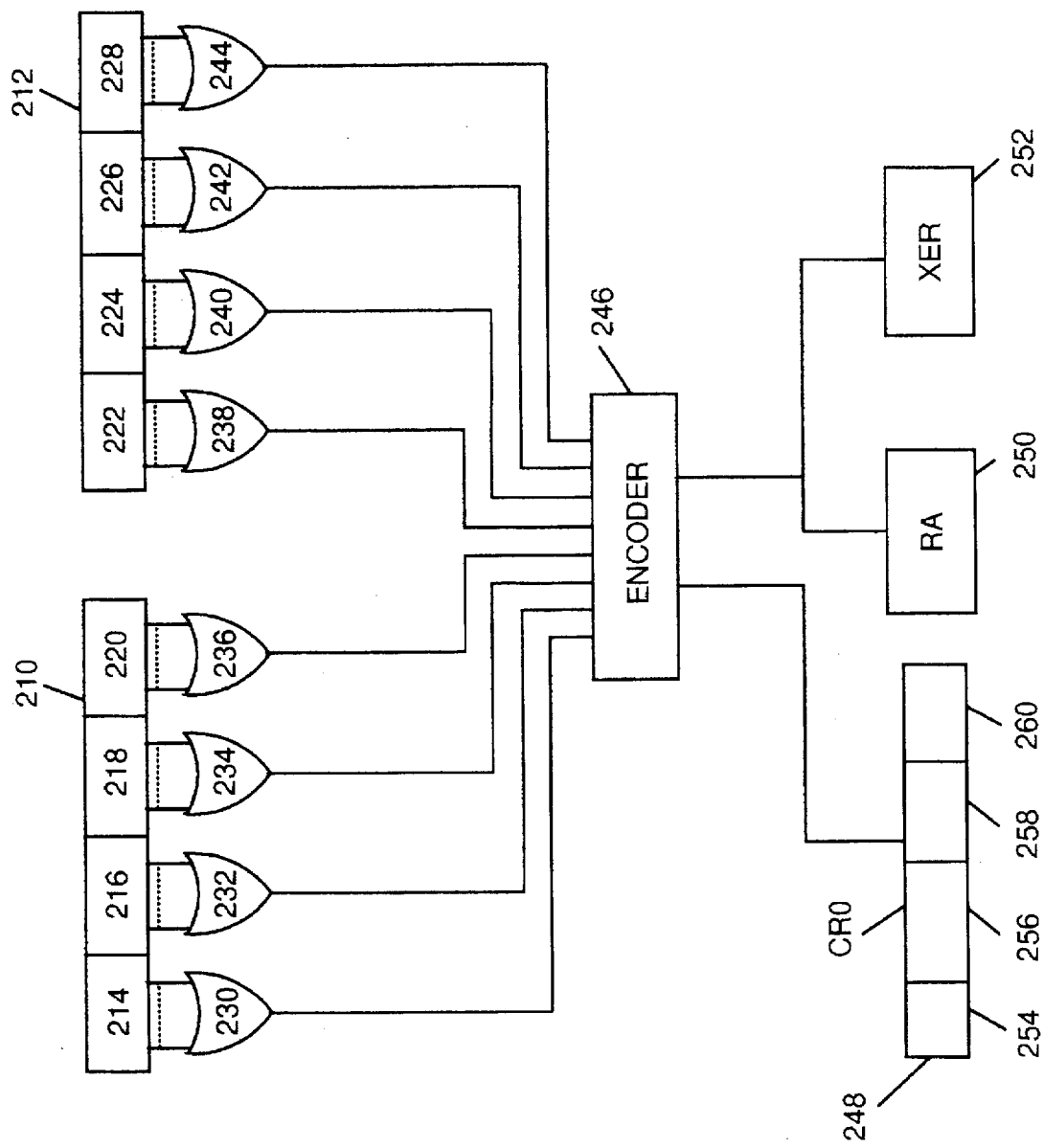
FIG. 2 is a block diagram of logic implementing the present invention.

FIG. 2 is a block diagram showing a high level view of a logic circuit embodying the present invention. The logic circuit has two registers, RS 210 and RB 212, of four bytes 214–220, 222–228 each. Outputs of each register 214–228 are connected to the inputs of corresponding OR gates 230–244. The outputs of OR gates 230–244 are connected to an encoder 246. The outputs of the encoder 246 are, in turn, connected to the CR0 register 248, the RA register 250 and the XER register 252.

Registers RS 210 and RB 212 each hold four bytes 214–220, 222–228 of eight bits each. A bit is a binary value and can be either "0" or "1". Most programming languages, including C, internally represent characters and control codes such as null as eight bit values. A null is represented as a byte in which all eight bits are "0." Thus, the two registers 210, 212 can together hold a total of eight characters or control codes. See B. Kernighan & D. Ritchie, *The C Programming Language*, Prentice-Hall, 2d Ed. 1988, pp. 36–46, which is hereby incorporated by reference, for a more complete discussion of how C internally represents data.

Each of the eight OR gates 214–228 has eight inputs and one output. Each input of an OR gate 230–244 is connected to a bit of a corresponding register byte 214–228 output. For example, each input of OR gate 230 is connected to a bit output of register byte 214. Each OR gate 230-244 performs a logical OR on its inputs and sends the result to the encoder 246. Of course, an OR gate 230-244 will output a "1" if any of its inputs is a "1". If all of the inputs are "0", an OR gate 230-244 will output a "0".

The encoder 246 receives as input the results of the eight OR operations performed by the OR gates 230-244. The encoder 246 outputs null byte detection information to the CR0 248, RA 250 and XER 252 registers which indicates whether and/or where a null byte is found. The encoder 246 outputs a number to the XER 252 and RA 250 registers which represents the byte number of the leftmost byte whose logical OR value is "0" with the bytes 214-228 numbered from left to right starting with "1", or encoder 246 outputs an "8" if no byte has a logical OR value of "0". For example, if both bytes 218 and 224 have a logical OR value of "0", the encoder 246 will store a "3" in XER register 252, which is the byte number of the leftmost byte to output a "0" (byte 218).

The CR0 register 48 has four bits 254-260. These bits 254-260 normally hold the results of comparison operations performed by processor instructions. Bit 254 is set to "1" to indicate less than ("LT"), bit 256 is set to "1" to indicate greater than ("GT"), bit 258 is set to "1" to indicate equal ("EQ") and bit 260 is set to "1" to indicate summary overflow. The encoder 246 sets the EQ bit 258 if no input to encoder 246 has a logical OR value of "0", sets GT bit 256 if any of the first four bytes 214-220 have a logical OR value of "0" and sets the LT bit 254 if any of the second four bytes 222-228 have a logical OR value of "0" and none of the first four bytes are "0."

In operation, the dlmzb instruction is typically combined with other machine instructions. For example, the PowerPC processor can use dlmzb to execute the C language function strcmp(). This function compares two strings, A and B, and returns a 0 if the strings are equal, a 1 if A is greater than B or a 0 if A is less than B. The pseudocode in Appendix I explains how the PowerPC executes the strcmp() function.

The source code in Appendix II shows how strcmp() is actually performed by the PowerPC 400 processor 10. This code may appear convoluted to the reader because it has been optimized to take advantage of the instruction pipelining features of the PowerPC 403GA processor. The lines of the source code have been numbered to assist the below explanation.

In the code example of Appendix II, strings A and B are located at the memory addresses held in registers r3 and r4, respectively. Line 2 loads four bytes of A into r5 and four bytes into r6. Similarly, line 3 loads B into r7 and r8. Lines 4 and 5 compare r5 with r7 and r6 with r8 and store the results in CR6 and CR7, respectively. These results can be equal ("="), greater than (">") or less than ("<").

Line 6 contains the present invention. The instruction, dlmzb., detects the presence of a null byte in either r5 or r6 and stores the location of the null byte, or an eight if no null is found, in XER and r9. In addition, the ". " after the instruction implicitly tells the processor to store the condition flags (>,< or =) in the CR0 register.

Line 7 branches to the a_ne subroutine if the condition flag in CR6 is not set to =. Note that this flag was set in line 4. Lines 8 and 11 increment the pointers to A and B, respectively. Line 9 branches to rtn_eq if the CR0 register is set to >. Line 10 branches to b_ne if CR7 is not set to =. Line 12 branches back to line 2 if CR0 is set to >, indicating that a null was found in the first 4 bytes.

The rtn_eq subroutine at line 13 returns a zero by storing that value in r3. Line 14 branches back to the routine that called the strcmp() function.

The a_ne subroutine begins at line 15. Line 15 branches to a_ex if CR0 contains a < or =. Lines 16–19 execute if the GT bit 258 of CR0 is not set. These instructions use the value in r9 to shift the word to the right, thereby accounting for the null. Line 20 recompares the values in r5 and r7. Line 21 branches to rtn_eq if CR6 contains =.

Subroutine a_ex begins on line 22. Line 22 branches to rtn_gt if CR6 contains >. Otherwise, lines 23–24 return a −1 to the calling routine.

Subroutine b_ne begins on line 25. Line 25 branches to b_ex if CR0 contains a > or =. Otherwise, lines 26–31 perform a shift, recompare and a conditional branch if the LT bit 256 of CR0 is not set. Thus, b_ne is much like a_ne.

Line 32 marks the beginning of b_ex. Line 32 branches to rtn_gt if CR7 contains a >. Otherwise, lines 33–34 return a −1 to the calling routine. Similarly, rtn_gt, starting on line 35, returns a 1 to the calling routine.

For a more detailed description of PowerPC program instructions, with the exception of dlmzb, the reader is advised to consult The PowerPC 403GA Embedded Controller User's Manual, IBM Doc. MPR403-UMV-01, September 1994, which is hereby incorporated by reference herein.

The source code and system design described above are for illustrative purposes only and various changes of the above may be within the scope of the appended claims.

Although the present invention and its advantages have been described in detail, it should be understood that various changes, substitutions and alterations can be made to the above without departing from the spirit and scope of the invention as defined by the appended claims.

APPENDIX I

Load 8 bytes of both strings being compared
Loop:
If high order words are not equal
   If no nulls in high order word of first operand
      If a>b
         Return 1
      Else
         Return −1
   Else
      Shift right to eliminate bytes to the right of the nulls
      Recompare
      If a>b
         Return 1
      Else
         If a=b
            Return 0
         Return −1
Else
   If nulls in high order word
      Return 0
   If low order words are not equal
      If no nulls in low order word of first operand
         If a>b
            Return 1
         Else
            Return −1
      Else
         Shift right to eliminate bytes to the right of the nulls
         Recompare
         If a>b
            Return 1

-continued

APPENDIX I

Else
    If a=b
Else goto Loop

APPENDIX II

| | | |
|---|---|---|
| loop: | lswi | r5,r3,8 |
| | lswi | r7,r4,8 |
| | cmplw | 6,r5,r7 |
| | cmplw | 7,r6,r8 |
| | dlmzb. | r9,r5,r6 |
| | bne | cr6,a_ne |
| | addi | r3,r3,8 |
| | bgt | rtn_eq |
| | bne | cr7,b_ne |
| | addi | r4,r4,8 |
| | bge | loop |
| rtn_eq: | addi | r3,0,0 |
| | blr | |
| a_ne: | ble | a_ex |
| | slwi | r9,r9,3 |
| | subfic | r9,r9,32 |
| | srw | r5,r5,r9 |
| | srw | r7,r7,r9 |
| | cmplw | 6,r5,r7 |
| | beq | cr6,rtn_eq |
| a_ex: | bgt | cr6,rtn_gt |
| | addi | r3,0,−1 |
| | blr | |
| b_ne: | bge | b_ex |
| | slwi | r9,r9,3 |
| | subfic | r9,r9,64 |
| | srw | r6,r6,r9 |
| | srw | r8,r8,r9 |
| | cmplw | 7,r6,r8 |
| | beq | cr7,rtn_eq |
| b_ex: | bgt | cr7,rtn_gt |
| | addi | r3,0, −1 |
| | blr | |
| rtn_gt: | addi | r3,0,1 |
| | blr | |

What is claimed is:

1. A logic circuit for detecting a null byte in a character string comprised of at least one character, comprising:
    register means for storing said character string;
    means for performing a logical OR operation on each character of said character string to produce a result;
    encoder means for interpreting said result of each said logical OR operation to produce an output which contains null byte detection information; and
    output register means for holding said output produced by said encoder means.

2. A logic circuit for detecting a null byte in a character string, comprising:
    a first register holding a plurality of bits;
    a second register holding a plurality of bits;
    a plurality of OR gates, each OR gate of said plurality of OR gates connected to a subset of said plurality of bits of said first and said second registers, and each said OR gate having at least one OR gate output, each said OR gate performing a logical OR operation on said plurality of inputs to produce an OR gate result;
    an encoder for interpreting data having at least one encoder output, said encoder for interpreting data connected to said at least one OR gate output of each said OR gate, said encoder interpreting said OR gate result produced by each said OR gate to produce an encoder result which contains null byte detection information; and
    at least one output register connected to said at least one output of said encoder for storing output of said encoder.

3. The logic circuit of claim 2, wherein said first and said second registers hold 32 bits each.

4. The logic circuit of claim 2, wherein there are eight OR gates.

5. The logic circuit of claim 2, wherein each said OR gate has eight inputs and one output.

6. The logic circuit of claim 2, wherein said encoder has eight inputs.

7. A method of detecting a null byte in a character string comprising at least one byte, said method comprising the steps of:
    performing a logical OR operation on each said at least one byte to produce a result;
    evaluating said result with an encoder to produce an output which contains null byte detection information; and
    storing said encoder output to at least one register.

8. A method of detecting a null byte in a character string comprising at least one byte, said method comprising the steps of:
    logically concatenating a first 32-bit character string and a second 32-bit character string into a 64-bit character string;
    dividing said 64-bit character string into eight bytes;
    performing a logical bitwise OR operation on each byte of said eight bytes to produce one or more result signals;
    evaluating said one or more result signals with an encoder to produce null byte detection information; and
    setting at least one output register to indicate said null byte detection information produced by said encoder.

9. A data processing system for detecting a null byte in a character string comprised of at least one character, said system comprising:
    a central processing unit;
    register means associated with said central processing unit for storing said character string;
    logic means associated with said central processing unit for performing a logical OR operation on each character of said character string to produce a result;
    encoder means associated with said central processing unit for interpreting said result of said OR operation to produce an output which contains null byte detection information; and
    output register means associated with said central processing unit for holding said output of said encoder means.

10. The device of claim 9, wherein said register means holds 64 bits.

11. The device of claim 9, wherein said logic means is comprised of eight OR gates.

12. The device of claim 11, wherein each OR gate of said eight OR gates has eight inputs and one output.

13. A data processing system for detecting a null byte in a character string comprised of at least one character, said system comprising:
    a central processing unit;
    register means associated with said central processing unit for storing said character string;
    means for logically concatenating a first 32-bit character string and a second 32-bit character string into a 64-bit character string;

means for dividing said 64-bit character string into eight bytes;

means for performing a logical bitwise OR operation on each byte of said eight bytes to produce one or more result signals;

means for evaluating said one or more result signals with an encoder to produce null byte detection information; and means for setting at least one output register to indicate said null byte detection information produced by said encoder.

14. A logical circuit for detecting a null byte in a character string comprising:

a first register holding a first 32-bit character string;

a second register holding a second 32-bit character string;

means for logically concatenating the first 32-bit character string and the second 32-bit character string into a 64-bit character string;

means for dividing said 64-bit character string into eight bytes, each byte comprising eight bits;

eight OR gates, each OR gate having as inputs the eight bits comprising a different one of each of said eight bytes, and each said OR gate having at least one OR gate output, each said OR gate performing a logical OR operation on its inputs to produce an OR gate result;

an encoder for interpreting data having at least one encoder output, said encoder for interpreting data connected to said at least one OR gate output of each said OR get, said encoder interpreting said OR gate result produced by each said OR gate to produce an encoder result which contains null byte detection information; and at least one output register connected to said at least one output of said encoder for storing output of said encoder.

15. The logic circuit of claim 14, wherein each OR gate has one output.

16. The logic circuit of claim 14, wherein said encoder has eight inputs.

17. A microprocessor instruction for detecting a null byte at the end of a character string comprised of at least one character wherein said instruction logically concatenates a first 32-bit character string and a second 32-bit character string into a 64-bit character string;

divides said 64-bit character string into eight bytes;

performs a logical bitwise OR operation on each byte of said eight bytes to produce one or more result signals;

evaluates said one or more result signals with an encoder to produce null byte detection information; and sets at least one output register to indicate said null byte detection information produced by said encoder.

18. The microprocessor instruction of claim 17, wherein the microprocessor instruction integrates well with reduced instruction-set computer design techniques.

* * * * *